United States Patent
Ren et al.

(10) Patent No.: US 10,934,475 B2
(45) Date of Patent: Mar. 2, 2021

(54) SURFACTANT FOR ENHANCED OIL RECOVERY

(71) Applicant: University of Houston System, Houston, TX (US)

(72) Inventors: Zhifeng Ren, Pearland, TX (US); Feng Wang, Houston, TX (US); Dan Luo, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 15/744,924

(22) PCT Filed: Jul. 15, 2016

(86) PCT No.: PCT/US2016/042519
§ 371 (c)(1),
(2) Date: Jan. 15, 2018

(87) PCT Pub. No.: WO2017/015120
PCT Pub. Date: Jan. 26, 2017

(65) Prior Publication Data
US 2019/0016943 A1     Jan. 17, 2019

Related U.S. Application Data

(60) Provisional application No. 62/194,035, filed on Jul. 17, 2015.

(51) Int. Cl.
*C09K 8/584* (2006.01)
*B82Y 30/00* (2011.01)
*C09K 8/60* (2006.01)
*B82Y 40/00* (2011.01)

(52) U.S. Cl.
CPC ............ *C09K 8/584* (2013.01); *C09K 8/602* (2013.01); *B82Y 30/00* (2013.01); *B82Y 40/00* (2013.01); *C09K 2208/06* (2013.01); *C09K 2208/10* (2013.01)

(58) Field of Classification Search
CPC .... C09K 8/584; C09K 8/602; C09K 2208/06; C09K 2208/10; B82Y 30/00; B82Y 40/00
See application file for complete search history.

(56) References Cited

U.S. PATENT DOCUMENTS

2012/0245058 A1   9/2012   Monteiro et al.
2012/0289613 A1   11/2012   Huang
2013/0102084 A1   4/2013   Loh et al.

FOREIGN PATENT DOCUMENTS

CN           103449429 A     12/2013

OTHER PUBLICATIONS

Janus graphene oxide nanosheets prepared via Pickering emulsion template, Wu, etc., Carbon, vol. 93, p. 473-483, available online May 29, 2015 (Year: 2015).*

(Continued)

*Primary Examiner* — Aiqun Li
(74) *Attorney, Agent, or Firm* — Conley Rose, P.C.

(57) ABSTRACT

A Janus graphene nanosheet (JGN) surfactant formed from a two-dimensional graphene oxide sheet and functionalized to produce an amphiphilic graphene nanosheet. The JGN may be a component of a nanofluid utilized in nanofluid flooding for oil recovery. The JGN may also be used as solid surfactants to form emulsions for oil recovery.

6 Claims, 13 Drawing Sheets

(56) References Cited

OTHER PUBLICATIONS

"Synthesis, characterization, and surface wettability properties of amine functionalized graphene oxide films with varying amine chain lengths", Shanmugharaj, et al., Journal of Colloid and Interface Science, 401, 2013, p. 148-154 (Year: 2013).*
International Patent Application No. PCT/US2016/042519 International Search Report and Written Opinion dated Oct. 20, 2016 (12 pages).
Liu et al., "Demulsification of Crude Oil-in-Water Emulsions Driven by Graphene Oxide Nanosheets," Energy Fuels, Jun. 24, 2015, vol. 29 (7), pp. 4644-4653 (retrieved from internet URL: <http://pubs.acs.org/doi/abs/10.1021/acs.energyfuels.5b00966>).

* cited by examiner

SURFACTANT FOR ENHANCED OIL RECOVERY

CROSS-REFERENCE TO RELATED APPLICATIONS

The present application is a National Phase entry of, and claims priority to, PCT Application No. PCT/US2016/042519, filed Jul. 15, 2016, which claims priority to U.S. Provisional Patent Application No. 62/194,035, filed Jul. 17, 2015, titled "Surfactant For Enhanced Oil Recovery," the entire contents of each being hereby incorporated by reference herein for all purposes.

STATEMENT REGARDING FEDERALLY SPONSORED RESEARCH OR DEVELOPMENT

This invention was made with Government support under Grant No. DE-FG02-13ER46917, awarded by United States Department of Energy; and under Grant No. DE-SC0010831, awarded by the United States Air Force Office of Scientific Research. The Government has certain rights in the invention.

BACKGROUND

Field of the Disclosure

The disclosure relates generally to surfactants for the recovery of oil. More particularly, the disclosure relates to an improved amphiphilic surfactant. Still more particularly, the present disclosure relates to a Janus graphene based two-dimensional nanosheet surfactant for: emulsification, use in a nanofluid, and enhanced oil recovery.

Background of the Disclosure

In the petroleum industry the percentage of recovery (or production) of oil from underground reservoirs may be less than 40% after water flooding. With a traditional enhanced oil recovery (EOR) method about 20% more crude oil may be extracted. Improving crude oil recovery by 1% worldwide would result in a huge amount of crude oil resources becoming available. However, the economic and environmental concerns are serious when chemical methods (such as surfactants or polymers flooding, etc.) are used for an average 10%-20% enhancement for tertiary oil recovery. Simple nanofluid (containing only nanoparticles) flooding at low concentration (0.01 wt. % or less) is an alternative, but the efficiency is below 5% in a saline environment (2 wt. % or higher NaCl content). Nanofluid flooding as an alternative tertiary oil recovery method has been recently reported (Torsater O, Engeset B, Hendraningrat L, & Suwarno S (2012) Improved Oil Recovery by Nanofluids Flooding: An Experimental Study. Paper presented at the Kuwait International Petroleum Conference and Exhibition of the Society of Petroleum Engineers, Kuwait City, Kuwait, 10-12 Dec. 2012; Hendraningrat L, Li S D, & Torster O (2013) A coreflood investigation of nanofluid enhanced oil recovery. *J Petrol Sci Eng* 111:128-138; Torsaeter O, Li S & Hendraningrat L (2013) Enhancing Oil Recovery of Low-Permeability Berea Sandstone through Optimised Nanofluids Concentration. Paper presented at the Enhanced Oil Recovery Conference of the Society of Petroleum Engineers, Kuala Lumpur, Malaysia, 2-4 Jul. 2013; Hendraningrat L & Torsaeter O (2015) Metal oxide-based nanoparticles: revealing their potential to enhance oil recovery in different wettability systems. *Appl Nanosci* 5(2):181-199; and Zargartalebi M, Kharrat R, & Barati N (2015); Enhancement of surfactant flooding performance by the use of silica nanoparticles. *Fuel* 143:21-27), wherein simple nanofluid flooding (containing only nanoparticles) at low concentration (0.01 wt. % or less) shows the greatest potential from the environmental and economic perspective. Further, environmentally save methods are needed for use in environmental cleanup operations, wherein low concentrations of active material (such as a nanofluid) would provide in of itself an environmentally friendly and economic approach to treating such spillages because of the very low concentrations of chemicals potentially used.

Several oil displacement mechanisms have also been proposed in the art, including reduction of oil-water interfacial tension (Binks B P (2002) Particles as surfactants—similarities and differences. *Curr Opin Colloid In* 7(1-2): 21-41; and Zhang H, Nikolov A, & Wasan D (2014) Enhanced Oil Recovery (EOR) Using Nanoparticle Dispersions: Underlying Mechanism and Imbibition Experiments. *Energ Fuel* 28(5):3002-3009), alteration of rock surface wettability ((Giraldo J, Benjumea P, Lopera S, Cortes F B, & Ruiz M A (2013) Wettability Alteration of Sandstone Cores by Alumina-Based Nanofluids. *Energ Fuel* 27(7): 3659-3665; Karimi A, et al. (2012) Wettability Alteration in Carbonates using Zirconium Oxide Nanofluids: EOR Implications. *Energ Fuel* 26(2)1028-1036; and Lim S, Horiuchi H, Nikolov A D, & Wasan D (2015) Nanofluids Alter the Surface Wettability of Solids. *Langmuir* 31(21):5827-5835), and generation of structural disjoining pressure (Wasan D T & Nikolov A D (2003) Spreading of nanofluids on solids. *Nature* 423(6936):156-159; Kondiparty K, Nikolov A D, Wasan D, & Liu K L (2012) Dynamic Spreading of Nanofluids on Solids. Part I: Experimental. *Langmuir* 28(41): 14618-14623; and Liu K L, Kondiparty K, Nikolov A D, & Wasan D (2012) Dynamic Spreading of Nanofluids on Solids Part II: Modeling. *Langmuir* 28(47):16274-16284). However, in these prior art methods the oil recovery factor remains below 5% with a 0.01% nanoparticle loading in core flooding tests in a saline environment (2 wt. % or higher NaCl content).

Further, Surfactant flooding is used in oil recovery to reduce the surface tension between the oil and water phase in the reservoir and also alter the wettability of the rock surface to thereby improve the mobility of the oil phase in reservoir.

In some examples, surfactants may comprise solid particles, which may produce emulsions, such as "Pickering emulsions", which adsorb onto the interface between the two phases (oil/water). Typically colloidal particles of micron size are used as such surfactants, however due to their sizes, the particles get trapped in the reservoir rock pores, which limits their application in oil recovery.

Nanomaterials that comprise signaling compositions for the assay of flowing liquid streams and geological formations and methods are also known in the art (such as in US 2012/0142111 and U.S. Pat. No. 8,986,641). However, nanoparticle stabilized emulsion droplets are much smaller so that they may travel through such pores in reservoir rocks, wherein irreversible adsorption of nanoparticles to the droplet surface leads to little retention to the rock pore surface, and such droplets may survive at harsh reservoir environmental conditions. Typically such nanoparticles are spherical in shape, and either one of hydrophilic or hydrophobic, therefore limiting formation environmental flexibility of use of such surfactants. A need therefore exists for surfactants, and nanofluids that are comprised of nanoparticle sized species that are amphiphilic in nature and therefore provide flexible functionality as surfactants in a variety of well environments.

BRIEF SUMMARY OF DISCLOSURE

Disclosed herein, in one embodiment is a Janus graphene nanosheet (JGN) surfactant, wherein the surfactant comprises a two dimensional graphene oxide, wherein the graphene oxide comprises a first face, and a second face, wherein the first face and the second face each comprise at least one oxygen-rich functional group; a hydrophobic species linked to the first face by the oxygen rich functional group; and the second face comprises a hydrophilic group, wherein the Janus graphene nanosheet is an amphiphilic surfactant. In another embodiment, the amphiphilic surfactant is a two dimensional amphiphilic surfactant.

In one embodiment of the JGN surfactant the graphene oxide is two dimensional. In a further embodiment of the JGN surfactant the graphene oxide is a sheet. In another embodiment of the JGN surfactant the sheet is about 0.8 nm to about 1.5 nm in thickness, and in a further embodiment the nanosheet is asymmetrical. In one embodiment the JGN surfactant comprises a large specific surface area, wherein the specific surface area is about 500 to about 5000 m$^2$/g. In another embodiment the JGN surfactant comprises an aspect ratio of about 10 to 1000.

In a further embodiment of the JGN surfactant, the surfactant adsorbs a greater surface area of oil droplets as compared to the same mass of spherical nanoparticle surfactants. In another embodiment, the JGN surfactant comprises a low density, wherein the low density is about 0.2 to about 1.5 g/cm$^3$. In a further embodiment the surfactant forms a lightweight emulsion, in a still further embodiment the surfactant comprises a high tensile strength, wherein the tensile strength is about 10-60 GPa. In some embodiments an emulsion is disclosed, wherein the emulsion comprises a JGN surfactant; water; and an oil, and in a further embodiment the oil is obtained from a natural geological formation; and in a still further environment the oil is obtained from an environmental spillage site.

In one embodiment a method of extracting oil from a formation is disclosed, wherein the method comprises adding an amount of a Janus graphene nanosheet surfactant to the formation; contacting the surfactant with a hydrocarbon of the formation; forming a emulsion comprising the surfactant, water and the hydrocarbon; removing the emulsion from the formation; and extracting the oil from the emulsion.

In another embodiment, a method of making a Janus graphene nanosheet (JGN) surfactant is disclosed, wherein the method comprises: forming a two dimensional graphene oxide sheet, wherein the graphene oxide sheet comprises a first face, and a second face, wherein the first face and the second face each comprise at least one oxygen-rich functional group; functionalizing the first face with a hydrophobic species chemically linked to the first face by the oxygen rich functional group; maintaining the second face unmodified with the oxygen rich functional group, and forming an amphiphilic surfactant, wherein the amphiphilic surfactant is a Janus graphene nanosheet (JGN) surfactant. In a further embodiment the hydrophobic species is an alkylamine, and in a still further embodiment the hydrophilic species is unmodified oxygen rich functional groups. In one embodiment a nanofluid is disclosed, wherein the nanofluid comprises: a Janus graphene nanosheet (JGN) surfactant, and wherein the JGN comprises two dimensional amphiphilic nanosheets.

In another embodiment an enhanced oil recovery method of extracting a hydrocarbon from a formation is disclosed, wherein the method comprises: adding a concentration of less than 0.01 wt. % of a nanofluid to the formation, wherein the formation comprises brine, contacting the nanofluid with a hydrocarbon of the formation, forming an interfacial film at a hydrocarbon-water interface, reducing an interfacial tension between the hydrocarbon and the water, separating the hydrocarbon from the water, and encapsulating the hydrocarbon to form an encapsulated hydrocarbon, removing the encapsulated hydrocarbon from the formation, and extracting the hydrocarbon from the formation.

In one embodiment a method of extracting oil from a formation is disclosed, wherein the method comprises: adding an amount of nanofluid to the formation; contacting the nanofluid with a hydrocarbon of the formation; removing the hydrocarbon from the formation; and extracting the oil from an outlet fluid, in another embodiment the nanofuid comprises a two dimensional amphiphilic material; in a further embodiment the two dimensional amphiphilic material is a Janus graphene nanosheet (JGN) surfactant; and in a still further embodiment the Janus graphene nanosheet (JGN) surfactant is in a concentration of between 0.000001 wt. % and 50 wt. %. In another embodiment of the method, the extracting oil from the formation comprises an environmental cleanup.

In some embodiments, herein disclosed are two dimensional amphiphilic Janus nanomaterials for oil recovery. In one embodiment, a two dimensional graphene based amphiphilic Janus nanomaterial (which may comprise a nanosheet, and forms a nanofluid for oil recovery) is disclosed. The nanofluids disclosed herein, may in one embodiment not be required to form an emulsion in order to extract a hydrocarbon from a formation, such as but not limited to: a geological formation, or an environmental spillage area.

Another embodiment disclosed herein is drawn to a method of extracting oil from a formation, the method comprising: adding an amount of a Janus graphene nanosheet surfactant to the formation; contacting the surfactant with a hydrocarbon of the formation; forming a emulsion comprising the surfactant, water and the hydrocarbon, and removing the emulsion from the formation. In a further embodiment disclosed herein a method of making a Janus graphene nanosheet (JGN) surfactant comprises forming a two dimensional graphene oxide sheet, wherein the graphene oxide sheet comprises a first face, and a second face, wherein the first face and the second face each comprise at least one oxygen-rich functional group; functionalizing the first face with a hydrophobic species chemically linked to the first face by the oxygen rich functional group; and forming an two dimensional amphiphilic surfactant. Another embodiment disclosed is use a Janus amphiphilic graphene nanosheet to form a nanofluid; contacting the nanofluid with a hydrocarbon of the formation; and the nanofluid removing crude oil from the formation.

DETAILED DESCRIPTION OF DISCLOSED EXEMPLARY EMBODIMENTS

Figure 1:
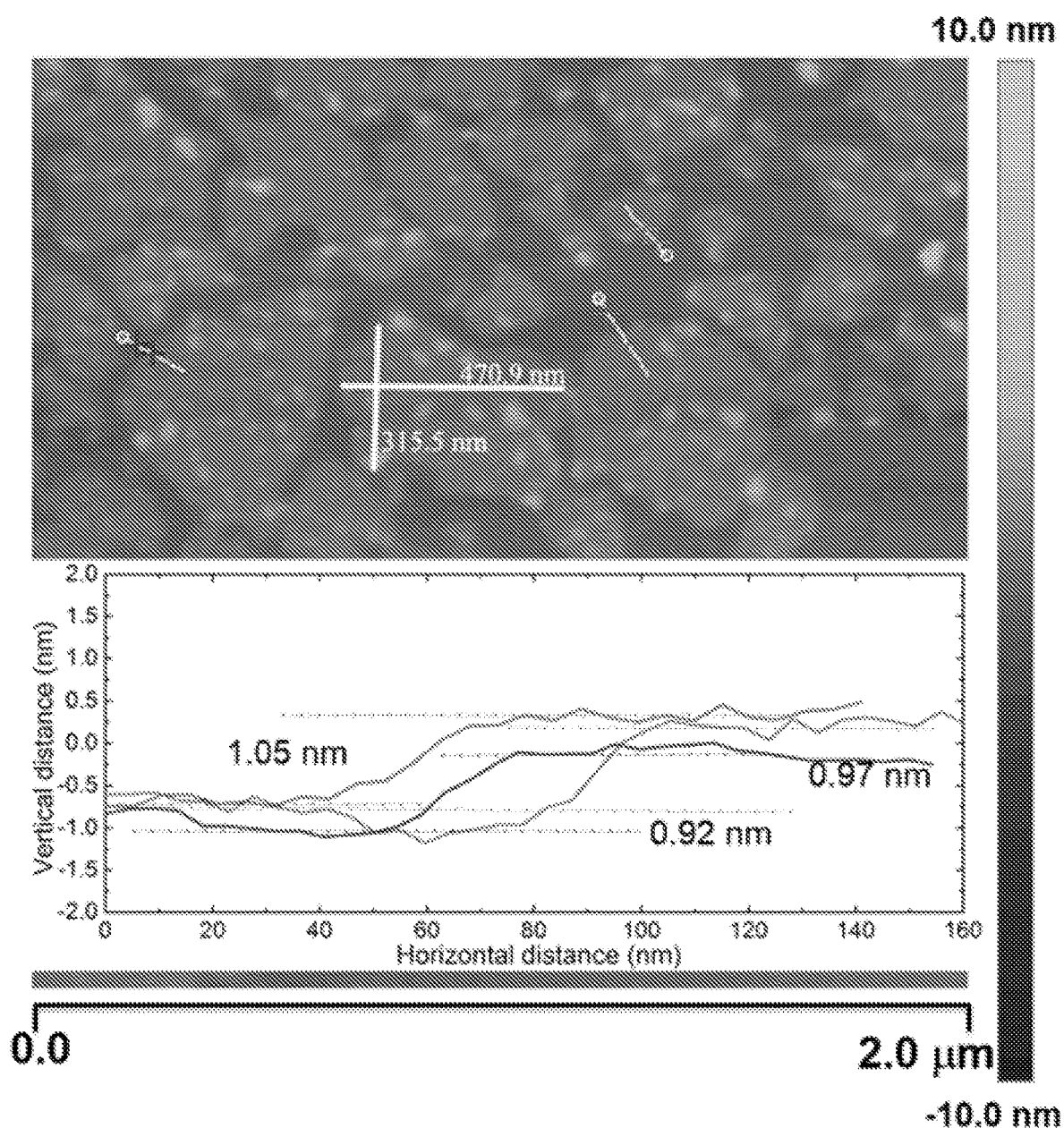
FIG. 1. AFM image depicting the thickness of an embodiment of a graphene oxide nanosheet (of the present disclosure) at different surface locations.
Figure 2:
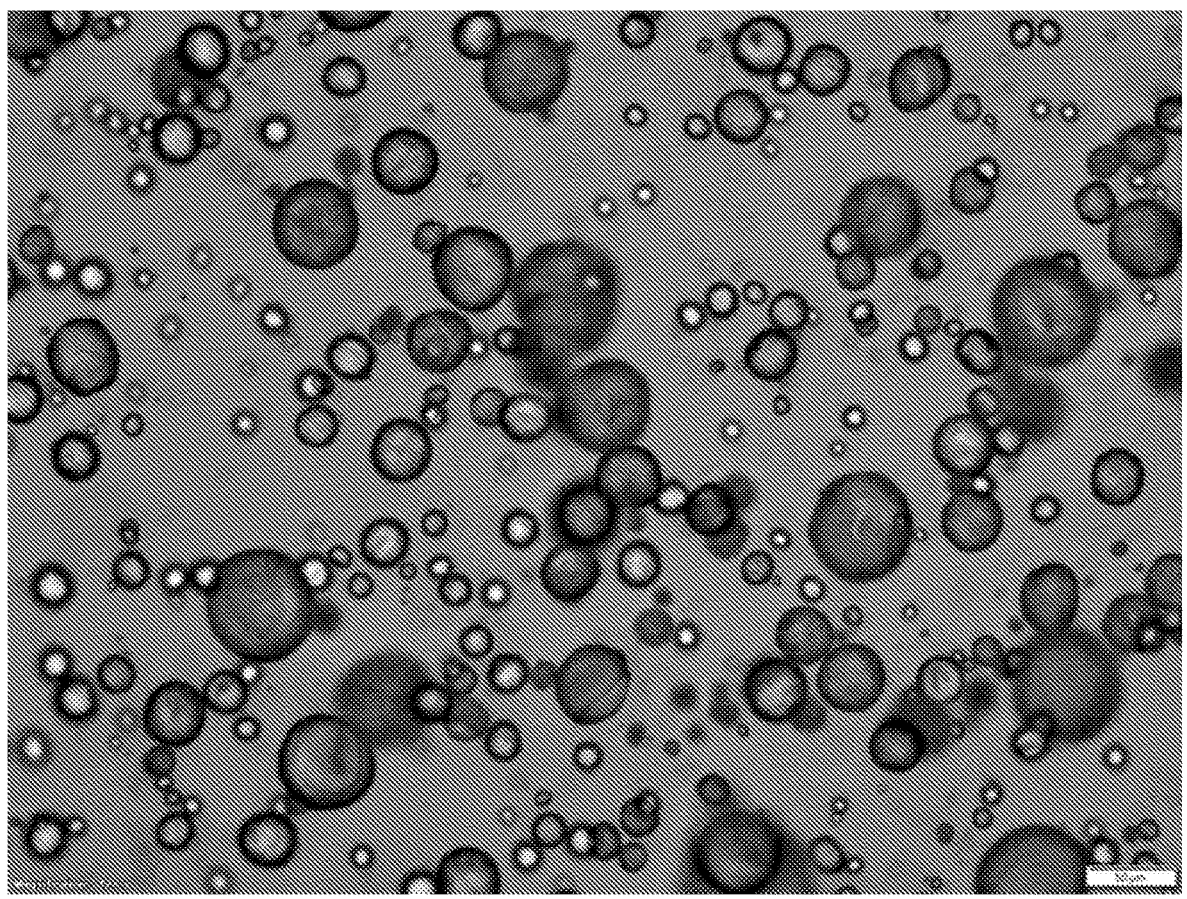
FIG. 2. Optical microscopic image of GO coated wax microspheres (scale bar indicates 50 μm) of an exemplary embodiment of the present disclosure.

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." As used herein, the term "about," when used in conjunction with a percentage or other numerical amount, means plus or minus 10% of that percentage or other numerical amount. For example, the term "about 80%," would encompass 80% plus or minus 8%. References cited herein are incorporated in their entirety by such reference.

Janus particles are nanoparticles whose surfaces have two or more distinct physical properties. Therefore the surface of Janus nanoparticles allows two different types of chemistry to be performed on each of the different faces or sides of the same Janus particle. A Janus nanoparticle is produced by dividing the nanoparticle into two distinct parts, each of which may be made of a different material, or bear different functional groups. One face of a Janus nanoparticle may comprise of hydrophilic groups, therefore one surface is hydrophilic and the second face of the Janus nanoparticle may be comprised of hydrophobic groups, and therefore the second face is hydrophobic. The asymmetric structure of such particles therefore may result in specific chemical functionalization of each distinct surface, and may comprise a Janus graphene nanosheet surfactants which therefore comprise a 2D structure (Luo, D. et al., (2016) Nanofluid of Graphene-based Amphiphilic Janus Nanosheets for Tertiary or Enhanced Oil Recovery: High Performance at Low Concentration, PNAS, vol. 113, no. 28, 7711-7716). In some embodiments such surfactants comprise a large specific surface area, which is the total surface area of a material per unit of mass. For exemplary embodiments of graphene nanosheets, the specific surface areas are in the range of 500-5000 $m^2/g$, and in some embodiments are about 100-3000 $m^2/g$, and in other embodiments are about 2600 $m^2/g$. In some further embodiments such surfactants comprise a large aspect ratio, wherein an aspect ratio is defined as the ratio of the width to thickness, and in some embodiments is in the range of between 10 and 1000, for graphene nanoparticle, and in other embodiments may be in the range of 100-500, and in a further embodiment may be in the range of 200-300. Any of the above embodiments of said JGN's may comprise an efficient adsorption, which means a greater surface area of oil droplets are covered using less mass of JGNs compared to spherical nanoparticle surfactant such as silica nanoparticles known in the art.

In some further embodiments the JGN surfactants comprise a low density, which depending on the oxygen content, and may vary from 0.2 to 1.5 $g/cm^3$, compared to silica nanoparticles which have a density of about 2.2 $g/cm^3$. Such a low density results in a lightweight emulsion compared to other emulsions known in the art, wherein the lightweight emulsion has greater well/reservoir mobility. In addition, the JGN surfactants described herein comprise of a high tensile strength (i.e., the maximum amount of tensile stress that the surfactant can take before failure) and a high young's modulus (a measure of elasticity, equal to the ratio of the stress acting on a substance to the strain produced), which may impart the emulsion with a longer functional life span, and protect the emulsion droplets from negative well environmental factors and destruction of the emulsion. In an embodiment described herein a high tensile strength is about 10-60 GPa; in another embodiment 15-50 GPa; and in a further embodiment 25-40 GPa.

One exemplary embodiment of the invention herein described is therefore drawn to a Janus graphene nanosheet (JGN), wherein the nanoparticle may function as a surfactant, and wherein the surfactant is amphiphilic in nature (having both hydrophilic and hydrophobic function based on comprising both hydrophobic and hydrophilic groups, and is therefore biphasic). In a further embodiment such JGN surfactants may form stabile emulsions with improved efficiently and oil recovery function, wherein the JGN surfactants change their surfactant properties in response to environmental conditions, assemble into different structures, generate emulsions with different morphologies, and also induce phase inversion emulsification. JGN's may change their aggregation/dispersion behavior and also transform into different shapes in response to pH, salinity, temperature and oil type changes; stabilize different types of emulsions (oil-in-water and water-in-oil) and induce phase inversion of emulsions in response to changes in solution pH, salinity and temperature and oil type. As such in some further embodiments, JGN surfactants may also be used in environmental cleanup operations, wherein such low concentrations of active material (nanoparticle and nanosheets for example which comprise a nanofluid) provide in of itself an environmentally friendly and economic approach to treating such spillages by extracting the displaced oil from such spillages.

Synthesis of Janus Graphene Nanosheet (JGN)

A JGN comprises a graphene oxide scaffold. Graphene is a 2 dimensional and atomic scale nanomaterial. Graphite, which is both inexpensive and earth abundant, is ball milled for 1-100 hours, depending on the energy of the mills. After oxidization from ball-milled graphite, both surfaces of graphene become decorated with an abundance of oxygen containing groups thereby producing Graphene Oxide (GO), see for example Formula 1.

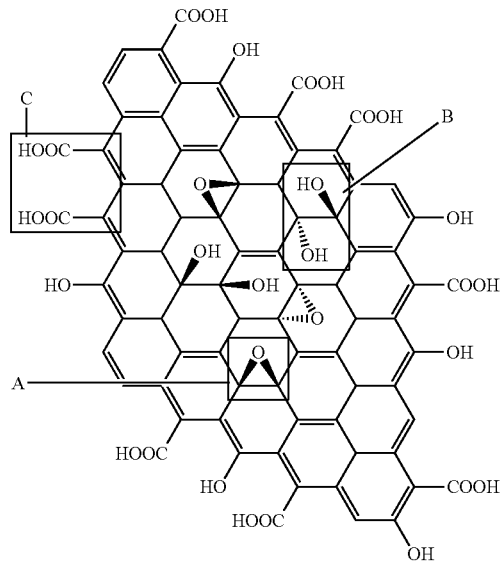

Formula 1: An example of a mono-layer graphene oxide comprising functional groups A: Epoxy bridges, B: hydroxyl groups, C: Pairwise carboxyl groups.

In one embodiment herein described are Janus graphene nanosheet surfactants for use in enhanced oil recovery (EOR). Graphene oxide (GO) is obtained by chemical oxidization of ball milled Graphite. Graphene oxide is decorated as described herein with a number of oxygen-containing groups on both surfaces. With addition of sodium chloride, charges from hydroxyl and carboxyl groups are screened. As a result, GO loses its hydrophilicity and is deposited onto surfaces of paraffin wax microspheres. The carboxyl and epoxy groups on the exposed surfaces of GO are functionalized with octadecylamine (ODA) in ethanol. The resulting material is amphiphilic Janus graphene nanosheet. The unmodified surface is hydrophilic with hydroxyl, carboxyl and epoxy groups; the (alkylamine) ODA-modified surface is hydrophobic with chains of 18 carbon atoms (ODA) extending outward.

Therefore the resulting particle is a Janus (two different faced) graphene nanosheet where one side or face is hydrophilic, and the other side or face is hydrophobic. The Janus nanosheets described herein may therefore possess amphiphilic functionality and may be used as surfactant, wherein the JGN emulsifies oil by forming in some embodiments a stable Pickering type emulsion by attaching to the oil droplet surfaces. Compared to conventional surfactant stabilized emulsions, this type of emulsion survives harsh reservoir conditions because of irreversible adsorption of nanosheets onto the oil droplet surface. This Janus graphene nanosheet surfactant also has advantages over other amphiphilic nanoparticles in that it has a large specific surface area, lower density and higher aspect ratio. The larger specific surface area makes it much more effective in generating a Pickering emulsion (wherein a Pickering emulsion is an emulsion that is stabilized by solid particles (for example colloidal silica) which adsorb onto the interface between the two phases). Further the lower density associated with such Janus particles ensures good transport capability throughout the reservoir. Such a material may be produced in a large quantity and is highly useful in enhanced oil recovery as it reduces cost, is environmentally favorable, as well as enhances efficiency.

EXAMPLES

Synthesis of Graphene Oxide 3.0 g of graphite was ball milled for 1-100 hours. A 9:1 mixture of concentrated $H_2SO_4/H_3PO_4$ (360:40 mL) was poured into the graphite, followed by adding 18.0 g of $KMnO_4$. The reaction was then heated to 45° C. and stirred for 8-20 hours. The resulting mixture was diluted with 400 mL of deionized water in an ice bath. 3 mL of 35% $H_2O_2$ was then added under moderate mixing over 1-60 min. 1-20 g of NaCl was added to the mixture. After sedimentation for 5-300 min, the supernatant was decanted. This process was repeated until the pH value reached 5. Then the mixture was filtrated to collect the solids, which were dispersed in deionized water and ultra-sonicated for 0.5-5 hour to obtain single layer graphene oxide (GO).

Characterization

Atomic Force Microscopy (AFM; Veeco Dimensions 3000 Atomic Force Microscope) was employed to examine the morphology of GO. Measurement was conducted using silicon AFM probes (HQ:NSC15/AL BS, Mikromasch) with a resonant frequency of ~325 kHz, a force constant of ~40 N m$^{-1}$, and a tip radius of ~8 nm. Imaging was done in tapping mode with resolutions of 512×512.

Scanning Electron Microscopy (SEM; FEI Quanta 200) was used to examine the cross-section of the sandstone cores under an accelerating voltage of 20 kV.

Fourier Transform Infrared Spectroscopy (FTIR) spectra were recorded on a Nicolet iS50 FTIR Spectrometer with an Attenuated Total Reflectance (ATR) accessory. Thermal Gravimetric Analysis (TGA) was performed on a TGA Q50 (TA Instrument) under nitrogen atmosphere at a rate of 10° C./min. Particle size and concentration were detected and visualized using a Malvern NanoSight NS300.

Atomic force microscopy was therefore employed to measure the thickness of the graphene oxide nanosheet (FIG. 1, and Table 1 below) as produced by an embodiments described herein. The average thickness of graphene oxide was about 1 nm, i.e., a single layer.

TABLE 1

The thickness of the graphene oxide nanosheet of FIG. 1 at different locations.

| Pair | Thickness |
|---|---|
| 1 | 990.645 (pm) |
| 2 | 1104.158 (pm) |
| 3 | 1194.73 (pm) |

Production of Janus Graphene Based Surfactant 5 ml of GO suspension (2 mg/ml) and 300 mg of paraffin wax (melting point 55° C.) were mixed with 50 ml of 1% sodium chloride solution. The mixture was heated at 65° C. with magnetic/mechanical stirring of 500-3000 rpm for half an hour. The mixture was cooled to room temperature, the GO coated wax microspheres were washed successively with deionized water, sodium hydroxide solution (pH~10), and ethyl alcohol. The products were collected and dispersed in 50 ml of ethyl alcohol. After addition of 200 mg of octadecylamine (ODA), the suspension was stirred for 12 hours. Then chloroform was injected to dissolve wax, followed by washing and centrifugation to obtain Janus graphene nanosheets. After drying, the graphene based surfactant was added to a toluene/water mixture of a certain ratio, e.g., (0.1:10)-(10:0.1) and sonicated for 5 min to generate an emulsion.

Figure 3:
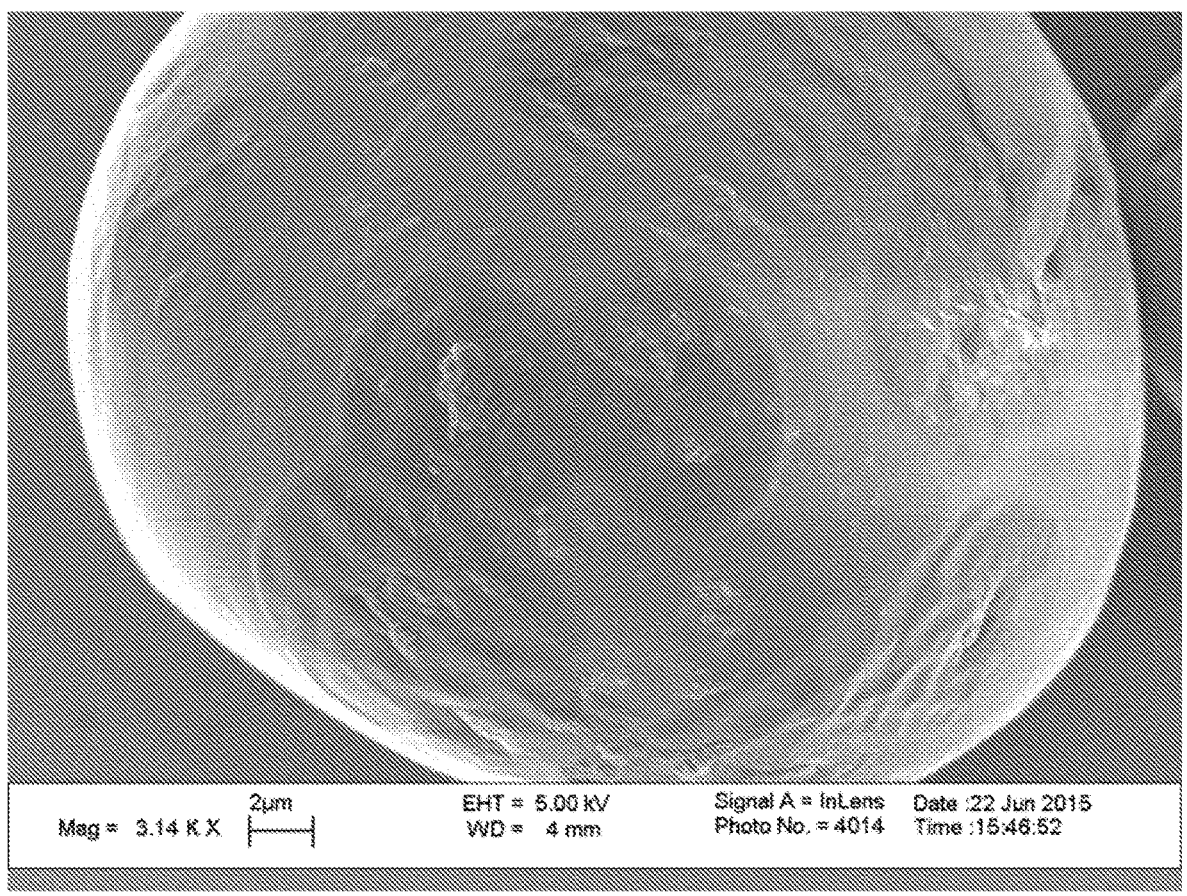
FIG. 3. SEM image of a GO coated wax microsphere (wherein the wrinkles indicate areas of GO deposition) of an exemplary embodiment of the present invention.

In one embodiment, stepwise formation of GO coated wax microspheres is disclosed, wherein unmodified GO which is highly hydrophilic, disperses well in water to form a suspension, but precipitated after addition of sodium chloride due to charge screening effect. Because GO may not able to emulsify wax, (leaving a wax film after cooling down), the majority of GO was still suspended in water. However, after addition of sodium chloride, no GO was observed in the lower water phase, and GO coated wax microspheres floated to the surface. The collected wax microspheres were dispersed in deionized water and examined under an optical microscope. The sizes of wax microspheres ranged from 1 to 70 μm (Figure. 3), from 5 to 40 μm and from 10 to 25 μm. From analysis of the microspheres by scanning electron microscopic (see for example the image of FIG. 3), it was concluded that the wrinkle like structures on the sphere surface were GO/GO aggregates. After functionalization of with ODA, the JGN surfactant was tested as a surface active agent in toluene/water system (1:1 vol.). After sonication, unmodified GO remained in the water phase rather than going to the upper toluene phase. However, the Janus graphene based surfactant formed a thin film at the toluene/water interface and flatten the interface, indicating it reduced the interfacial tension. After settling for about 18 hours, unmodified GO precipitated, while the film of JGN surfactant remained, thereby confirming its amphiphilicity.

Figure 5:
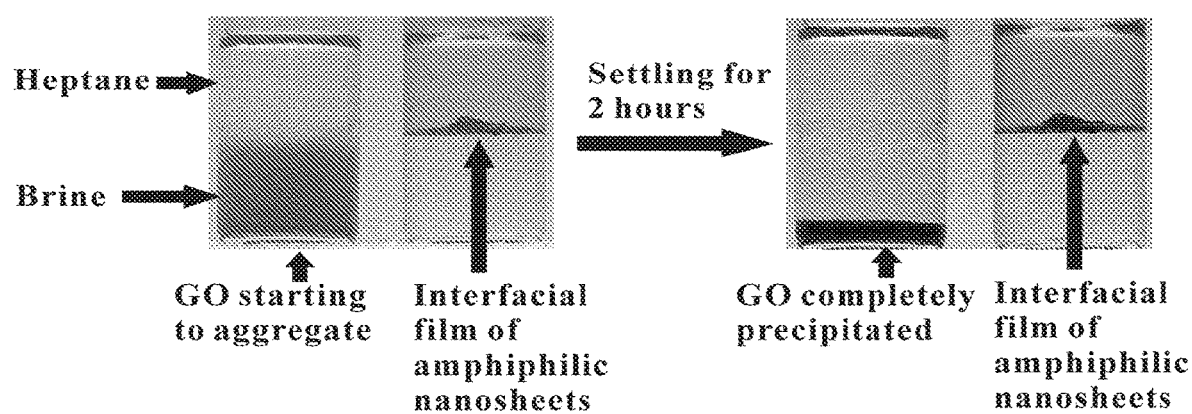
FIG. 5. Depicts the behavior of unmodified GO and embodiments of the amphiphilic nanosheets disclosed herein, in a heptane/brine system, wherein small pieces of interfacial film were attached to the hydrophilic glass surface in the heptane phase due to its amphiphilicity, which appeared as black dots.
Figure 6:
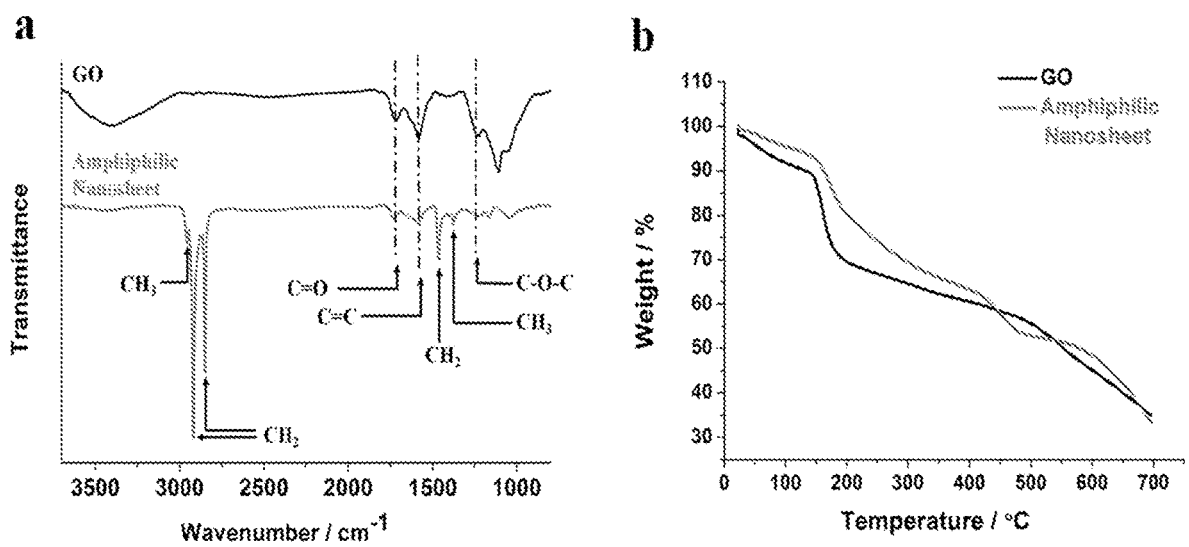
FIG. 6. Panel a) FTIR spectra and panel b) TGA curves of a GO and an amphiphilic nanosheet of an exemplary embodiment of the present disclosure.

Similarly, in a further embodiment, when either the unmodified GO or amphiphilic Janus nanosheets were injected into a heptane/brine system, the amphiphilic Janus nanosheets spontaneously accumulated at the heptane/brine interface while GO stayed only in the brine phase and instantaneously started to aggregate. When subjected to vortex-induced vibrations, the amphiphilic Janus nanosheets formed a thin interfacial film separating the heptane and brine in contrast to the GO agglomeration due to the salt screening effect (FIG. 5). After settling for 2 hours, unmodified GO precipitated while the interfacial film of the nanosheets remained intact, hence indicative of asymmetrical functionalization of GO with hydrocarbon chains. In FTIR analysis (Figure. 6, panel a), both GO and amphiphilic nanosheets exhibited peaks at 1723 cm$^{-1}$, 1587 cm$^{-1}$, and 1230 cm$^{-1}$, which may be assigned to C=O carbonyl/carboxyl, C=C aromatic, and C—O—C epoxy vibrations, respectively. In addition, amphiphilic nanosheets clearly demonstrated the presence of methylene groups (strong peaks at 1470 cm$^{-1}$, 2850 cm$^{-1}$, and 2925 cm$^{-1}$) and methyl groups (weaker signals at 1380 cm$^{-1}$ and 2960 cm$^{-1}$), which is indicative of the conjugation of hydrocarbon chains onto the GO surface. Compared to GO, the TGA curve of amphiphilic nanosheets displayed an additional weight loss stage between 400° C. and 500° C., which may be attributed to the decomposition of the carbon chains (FIG. 6, panel b).

Emulsion Process and Phase Behavior Test

Figure 4:
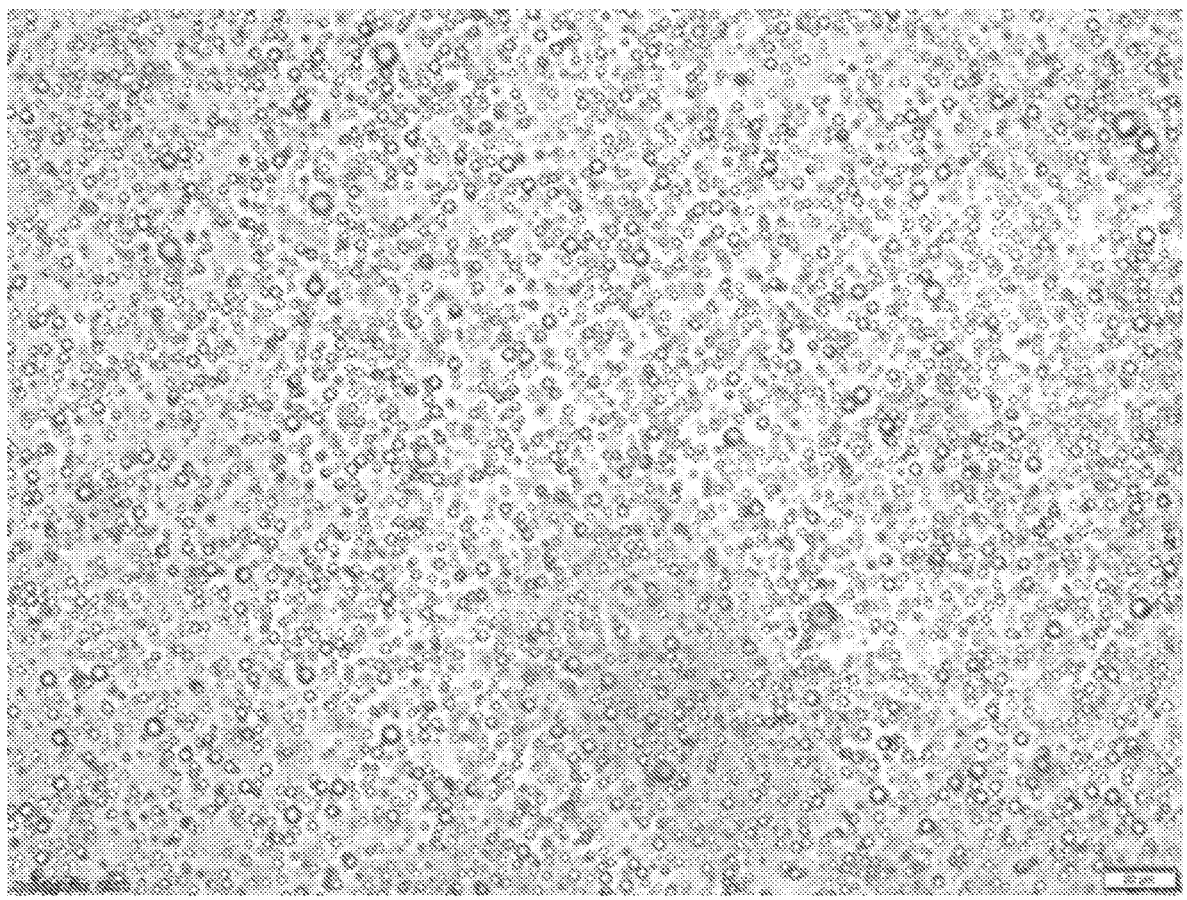
FIG. 4. Optical microscopic image of toluene droplets in an exemplary embodiment of the Janus graphene nanosheet surfactant emulsion, showing an average size of around 2 µm. Scale bar indicates 20 µm.

In one embodiment, 6 mg of JGN surfactant was added into a mixture of toluene/water (1:4 vol.). The mixture formed after sonicating in a water bath for a few seconds comprised one emulsion phase, and after transferring the mixture to a pipette, and allowing the mixture to reach equilibrium, three phases were formed. The phases were the toluene at the top, the emulsion in the middle and the water phase at the bottom. FIG. 4 shows the optical microscopic image of toluene droplets in the emulsion showing an average size of around 2 μm.

In another embodiment, 0.05% and 0.1 wt. % JGN surfactants were added into a mixture of toluene/water (1:1 mass ratio) respectively, wherein the mixture formed after sonicating in a water bath for a few seconds and comprised one emulsion phase. After transferring the same mixture to a pipette and allowing the mixture to reach equilibrium, three phases were formed. The phases were the toluene at the top, the emulsion in the middle and the water phase at the bottom. In a further embodiment, after about 20 days, each of the emulsion phases remained the same and were thus shown to remain stable.

Synthesis of a Nanofluid

In some embodiments, amphiphilic nanosheets were fabricated by a further wax-masking method, wherein graphene oxide (GO) was synthesized from ball-milled graphite by an embodiment of a chemical oxidation method. A mixture of paraffin wax (80 g), GO (200 mg) and water (300 g) with 1 wt. % NaCl was subjected to vigorous mechanical stirring at a temperature of 75° C. for 1 h. After washing with NaOH (pH ~9), deionized (DI) water and ethanol, the wax particles covered with GO were dispersed in a solution of alkylamine in absolute alcohol and stirred overnight. After washing with ethanol, the wax was dissolved with toluene and nanosheets were dried at 60° C. A very small amount of ethanol was added to the dried nanosheets. After 1 h of sonication, DI water was added to make the nanofluid suspension.

Thus in some embodiments, Janus amphiphilic nanosheets were produced by tuning the Janus balance of graphene oxide (GO) with alkylamine. Initially, GO was synthesized from chemical oxidation of graphite; single-surface hydrophobization was then carried out; and the nanofluid was made stable to avoid agglomeration of the nanosheets.

Stability Evaluation of the Nanofluid

Figure 7:
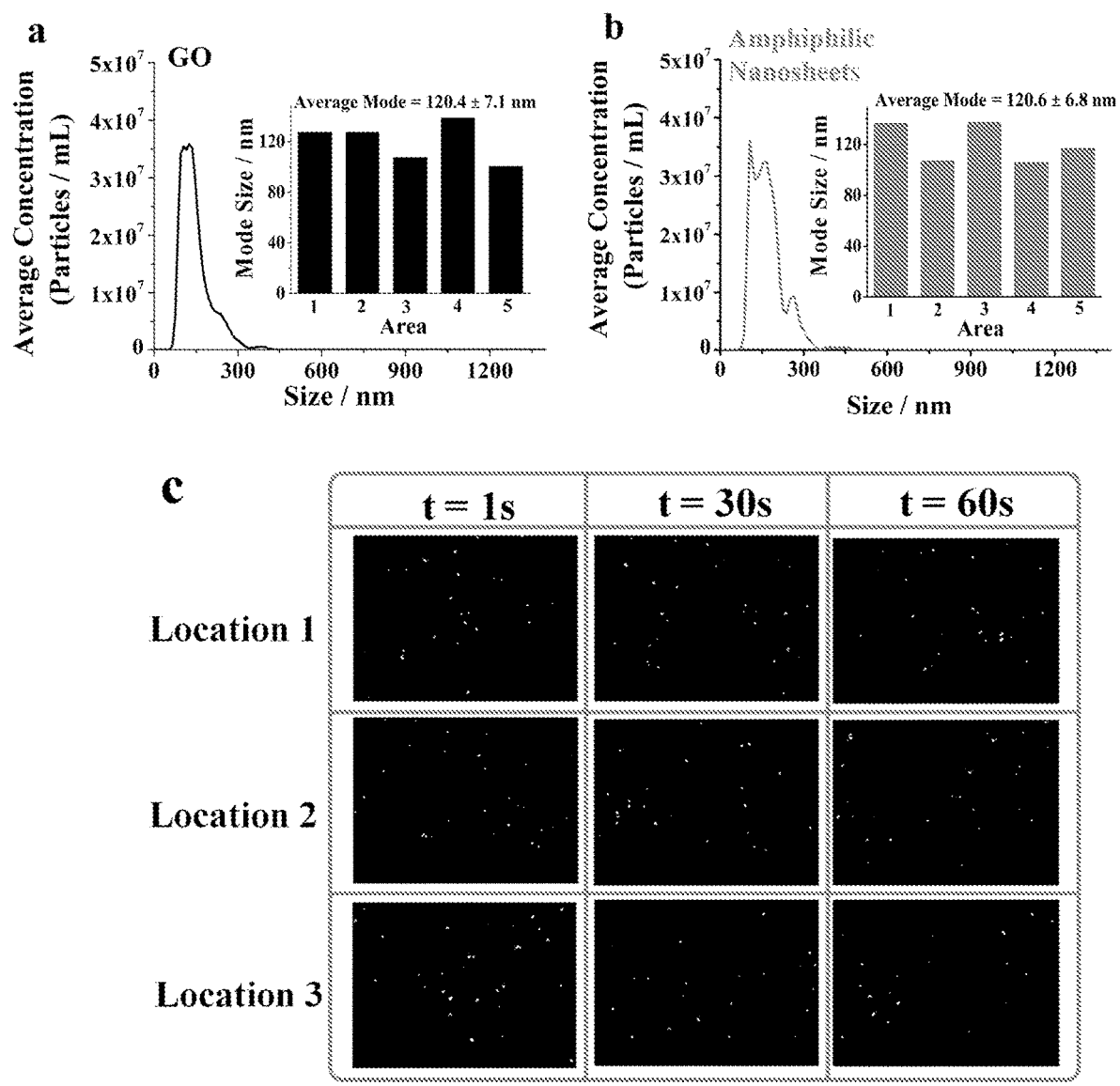
FIG. 7. Depicts hydrodynamic diameter distributions of panel a) GO and panel b) amphiphilic nanosheets in nanofluids with a concentration of 0.005 wt. % of an exemplary embodiment of the present disclosure, wherein insets indicate mode sizes; and panel c) which depicts selected photographs of amphiphilic nanosheets in the nanofluid in 3 locations at different time points.

In some embodiments, it is required that the nanofluid has good stability prior to being injected into the reservoir. From observation, both GO and amphiphilic nanosheets have very small amounts of precipitates even after 30 days. To evaluate the stability in microscopic view, the dispersions of GO and amphiphilic nanosheets were first subjected to bath sonication for 30 s before dilution to the concentration of 0.005 wt. %, and then injected into the chamber in the Malvern NS300 system, in which a laser passes through. Particles in the path of the laser scattered light and were visualized by a camera. Altogether, 5 locations were observed, each for a period of 60 s. FIG. 7 shows the average hydrodynamic diameter distribution of GO (FIG. 7, panel a) and amphiphilic nanosheets (FIG. 7, panel b). It appeared that the mode of hydrodynamic diameter of amphiphilic nanosheets was close to that of GO, implying that no agglomeration took place after functionalization. Images of amphiphilic nanosheet (nanofluid) at 3 locations at different time points were selected as examples (FIG. 7, panel c). Each bright dot represents a single nanosheet in Brownian motion. No aggregation (which would display as clusters) was detected. Therefore, in some embodiments the stability of the nanofluid may ensure that no extra additives or additional methods are required to preserve the nanofluid before injection.

Oil Displacement Efficiency and Mechanisms

In further embodiments disclosed herein, the nanofluid of graphene-based amphiphilic Janus nanosheets may be used for secondary, tertiary or enhanced oil recovery, to provide a high performance extraction of oil at a low concentration.

Core Flooding Test

Figure 13:
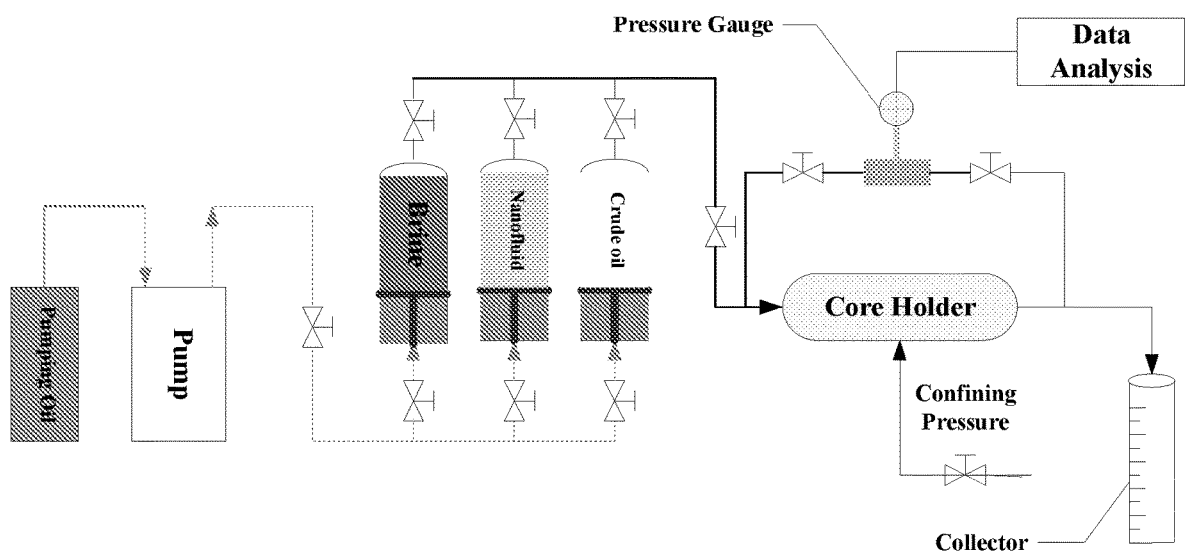
FIG. 13. Depicts a schematic of the core flooding equipment used in embodiments of core flooding tests described herein.

In some embodiments, four man-made sandstone rock cores were tested in flooding equipment (FIG. 13). The physical properties of the rock cores were measured and are listed in Table 2. Crude oil samples were taken from an oil field. The viscosity of the crude oil was 75 cP at 25° C. Nanofluids of 0.005 and 0.01 wt. % nanosheet concentration were injected into a saline environment (4 wt. % NaCl and 1 wt. % $CaCl_2$) to measure the enhanced oil recovery factor for rock cores with both low (samples 1 and 2) and high (samples 3 and 4) liquid permeability. The core flooding test was conducted sequentially with the following steps: cleaning of rock cores; saturating cores with brine; establishing initial brine water and oil saturation by oil injection until no more brine water was produced; brine water flooding until no more oil (i.e., 100% water cut) was produced; and nanofluid flooding until no more oil was extracted. The total injection volume of nanofluid for each flooding test was 3-4 times the pore volume (PV).

Therefore, in some embodiments, nanofluids of graphene based amphiphilic Janus nanosheets may be used for secondary, tertiary and improved oil recovery.

In some embodiments, the procedure for oil recovery comprises: a) cleaning the received rock cores (Table 2 below gives the physical properties of a sample of rock cores) with sequential treatment by toluene and methanol for 8 hour at 70° C. in a Soxhlet extractor; b) preparation of brine containing 4 wt. % NaCl and 1 wt. % $CaCl_2$; c) saturating rock cores with the brine for several hours and connecting the flooding equipment; d) injecting crude oil at 0.5 mL/min until there is no brine effluent to establish the initial oil and water saturations; e) brine flooding at 0.5 mL/min until there is no crude oil effluent and calculating the oil recovery factor; f) cleaning the rock cores as described in step a); g) saturating rock cores again with brine; h) injecting crude oil at 0.5 mL/min until no brine effluent to establish the initial oil and water saturations; i) nanofluid flooding at 0.5 mL/min until there is no crude oil effluent and calculating the oil recovery factor (Table 3 below shows such testing results).

TABLE 2

Physical properties of rock cores

| Rock Cores | Length, cm | Diameter, cm | Porosity, % | Average Liquid Permeability, mD | Pore Volume (PV), cm³ |
| --- | --- | --- | --- | --- | --- |
| 1 | 4.040 | 2.526 | 21.55 | 43.29 | 4.363 |
| 2 | 4.035 | 2.510 | 26.26 | 56.58 | 5.243 |
| 3 | 3.970 | 2.547 | 25.44 | 126.6 | 5.145 |
| 4 | 3.850 | 2.550 | 24.98 | 136.9 | 4.912 |

TABLE 3

Oil recovery factors by nanofluid flooding with differing concentrations

| Rock Core | Porosity (%) | Average Liquid Permeability (mD) | Nanofluid Concentration (wt. %) | Oil Recovery Factor After Brine Water Flooding (%) | Enhanced Oil Recovery Factor After Nanofluid Flooding (%) | Total Oil Recovery Factor (%) |
| --- | --- | --- | --- | --- | --- | --- |
| 1 | 24.8 | 54.4 | 0.005 | 71.1 | 6.7 | 77.8 |
| 2 | 26.0 | 44.5 | 0.01 | 62.5 | 9.5 | 72.0 |

TABLE 3-continued

Oil recovery factors by nanofluid flooding with differing concentrations

| Rock Core | Porosity (%) | Average Liquid Permeability (mD) | Nanofluid Concentration (wt. %) | Oil Recovery Factor After Brine Water Flooding (%) | Enhanced Oil Recovery Factor After Nanofluid Flooding (%) | Total Oil Recovery Factor (%) |
| --- | --- | --- | --- | --- | --- | --- |
| 3 | 27.9 | 130.0 | 0.005 | 68.2 | 10.2 | 78.4 |
| 4 | 25.8 | 132.0 | 0.01 | 69.6 | 15.2 | 84.8 |

In some embodiments, approximately 90% of the oil recovered by nanofluid flooding was extracted after the first PV injection. As shown in Table 3, under similar conditions (0.01% nanofluid concentration), recovery by the methods disclosed herein, was 15.2%, more than triple the best reported result of 4.7% (Hendraningrat L, Li S D, & Torster O (2013) A coreflood investigation of nanofluid enhanced oil recovery. J Petrol Sci Eng 111:128-138). Also in some embodiments, at a 0.005 wt. % nanofluid concentration, similar performance was seen.

In reservoirs, the motion of crude oil can be categorized into three scenarios depending on the local underground hydrodynamic power: static, slow, and fast moving. Therefore, in some embodiments the behavior of nanosheets under simulated hydrodynamic scenarios are used to study oil displacement mechanisms.

Figure 8:
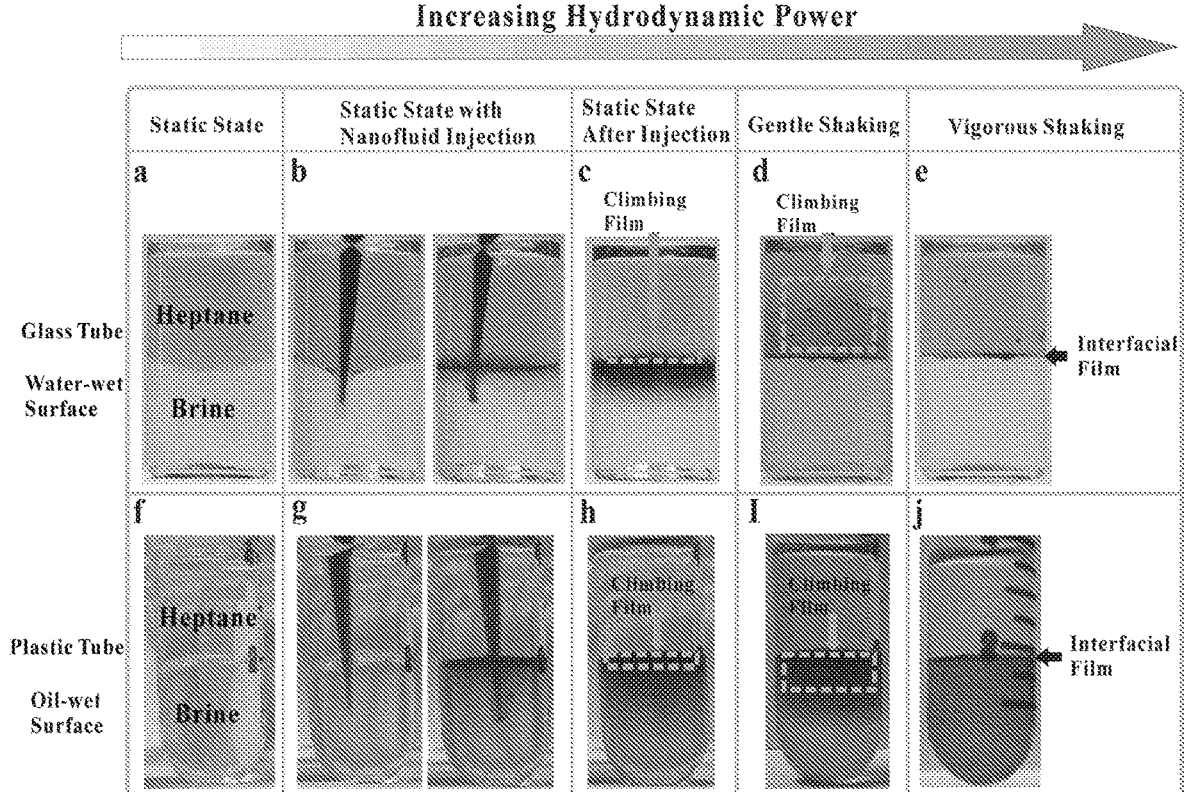
FIG. 8. Depicts the behavior of nanosheets of embodiments of the current disclosure. Panel a) through panel e) show the behavior of the nanosheets in the oil/brine system with increasing hydrodynamic power in a glass tube with water-wet surface (the heptane was dyed with Sudan Red 7B). Panel a) depicts a Heptane/brine mixture. Panel b) depicts nanosheets adsorbing to heptane/brine interface during nanofluid injection under static conditions. Panel c) depicts nanosheets at heptane/brine interface after injection; a climbing film appeared on the wall. Panel d) depicts growth of climbing film after gentle shaking. Panel e) depicts formation of the interfacial film after vigorous shaking. Further, panels f) through panel j) depict the behaviors of nanosheets in oil/brine system with increasing hydrodynamic power in a plastic tube with oil-wet surface (Sudan Red 7B was not used as the whole plastic tube would be dyed). Panel f) depicts a heptane/brine mixture. Panel g) depicts nanosheets adsorbing to heptane/brine interface during nanofluid injection under static conditions. Panel h) depicts nanosheets at heptane/brine interface after injection; a climbing film appeared on the wall. Panel i) depicts growth of climbing film after gentle shaking; and panel j) depicts formation of interfacial film after vigorous shaking.

In some embodiments, and as shown in FIG. 8, under static conditions, the interface between heptane and brine was concave in a water-wet glass tube but convex in an oil-wet plastic tube, indicating relatively strong interfacial tension. When the nanofluid was injected into the brine, electrostatic repulsion was screened by salt and hydrophobic attraction came into play. Therefore, in some embodiments, nanosheets spontaneously accumulated at the interface in each case. With increasing amount of nanosheets adsorbed at the interface, the interfacial tension was further reduced, as indicated by the increasingly flattened interface. As with conventional nanofluids, however, salt ions in the reservoir fluid were found to be a permeability damage factor due to increased nanoparticle aggregation. In other embodiments, the climbing film was also observed because locally raised nanosheet concentrations induced Marangoni stress (the stress produced by the gradient of interfacial tension) to push the oil-water interface up the tube surface. This film climbed upward in the case of the water-wet tube surface, which helped detach the oil phase at solid surface, but downward in the case of the oil-wet tube surface. For the oil-wet surface, nanosheets may be captured by the hydrophobic tube surface with the hydrophilic side facing the water phase. In some embodiments, such behaviors altered the wettability of the oil-wet surface.

Figure 9:
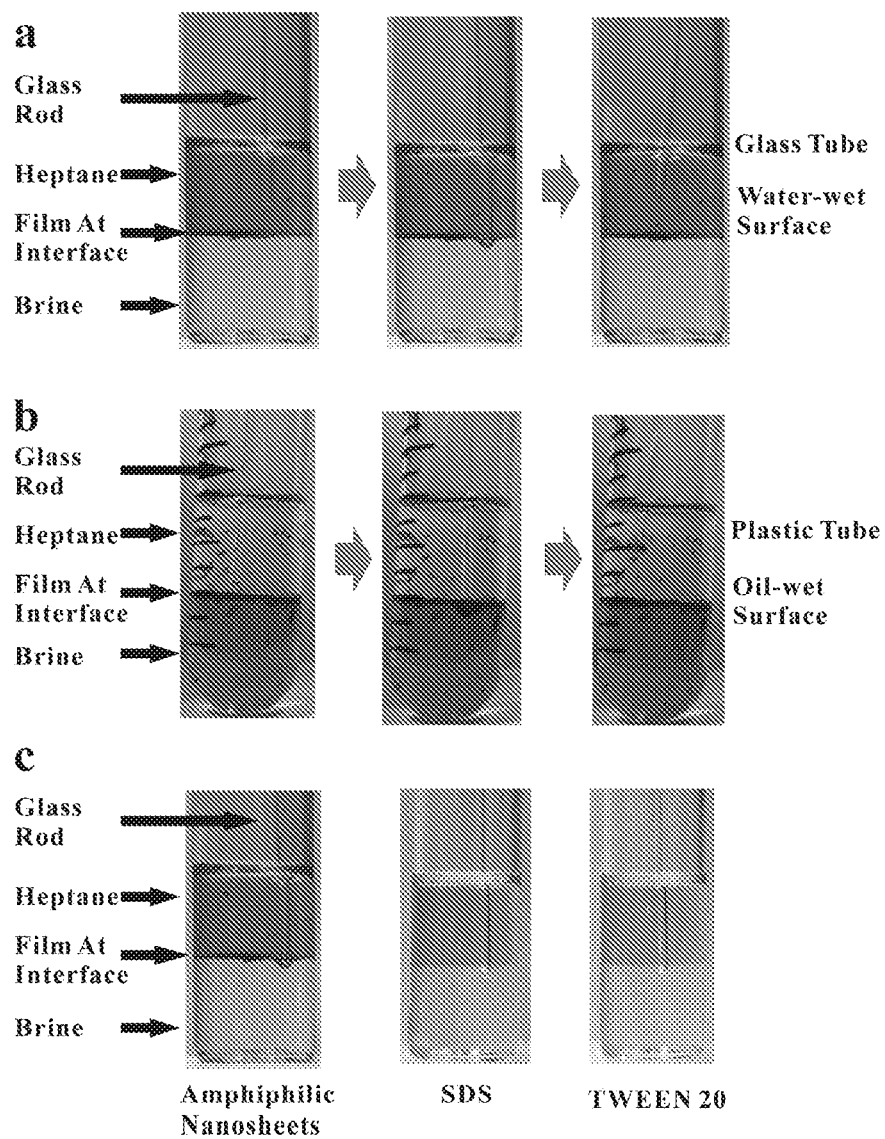
FIG. 9. Depicts testing of the elasticity of interfacial films (such as an interfacial climbing film). Panel a) depicts the interfacial film responding to intrusion of a glass rod in a glass tube with a water-wet surface (from left to right: before intrusion, during intrusion, after intrusion). Panel b) depicts the interfacial film responding to intrusion of a glass rod in a plastic tube with an oil-wet surface (from left to right: before intrusion, during intrusion, after intrusion); and panel c) depicts the heptane/brine interface with amphiphilic nanosheets (left), SDS (middle), and TWEEN 20 (right) responding to intrusion of a glass rod.
Figure 10:
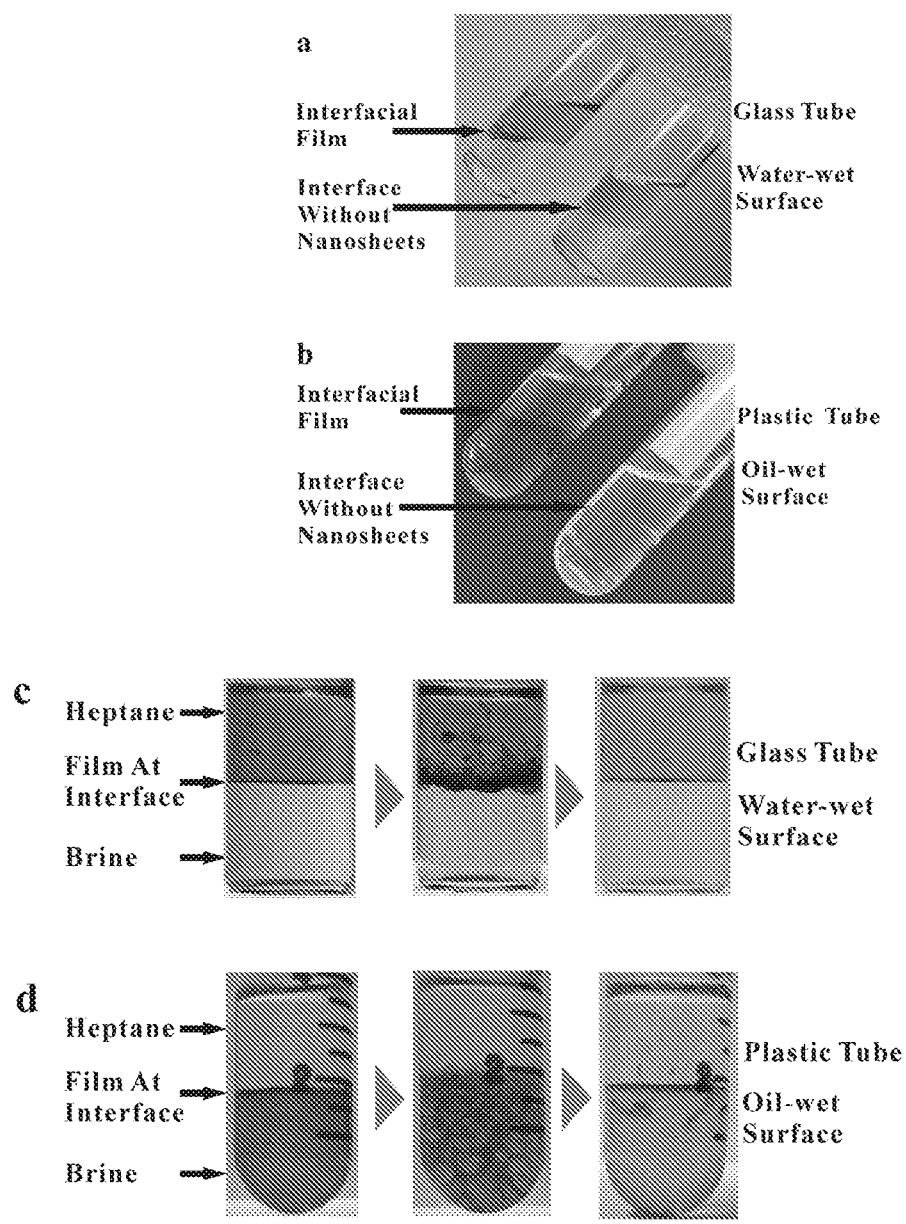
FIG. 10. Depicts testing the stability of interfacial films. Panel a) and Panel b) depict deformation of interfacial films upon tilting. Panel a) Is an image of heptane-brine interfaces in tilted glass tubes with water-wet surfaces (upper: interface with nanosheet interfacial film; lower: interface without nanosheets). Panel b) depicts an image of heptane-brine interfaces in tilted plastic tubes with oil-wet surfaces (upper: interface with nanosheet interfacial film; lower: interface without nanosheets). Panel c) and Panel d) depict reformation of interfacial films after shaking, wherein panel c) depicts an image of interfacial film under vigorous shaking in a glass tube with water-wet surface (from left to right: before shaking, during shaking, 1 minute after shaking), and panel d) depicts an image of interfacial film under vigorous shaking in a plastic tube with oil-wet surface (from left to right: before shaking, right after shaking, 1 minute after shaking)
Figure 11:
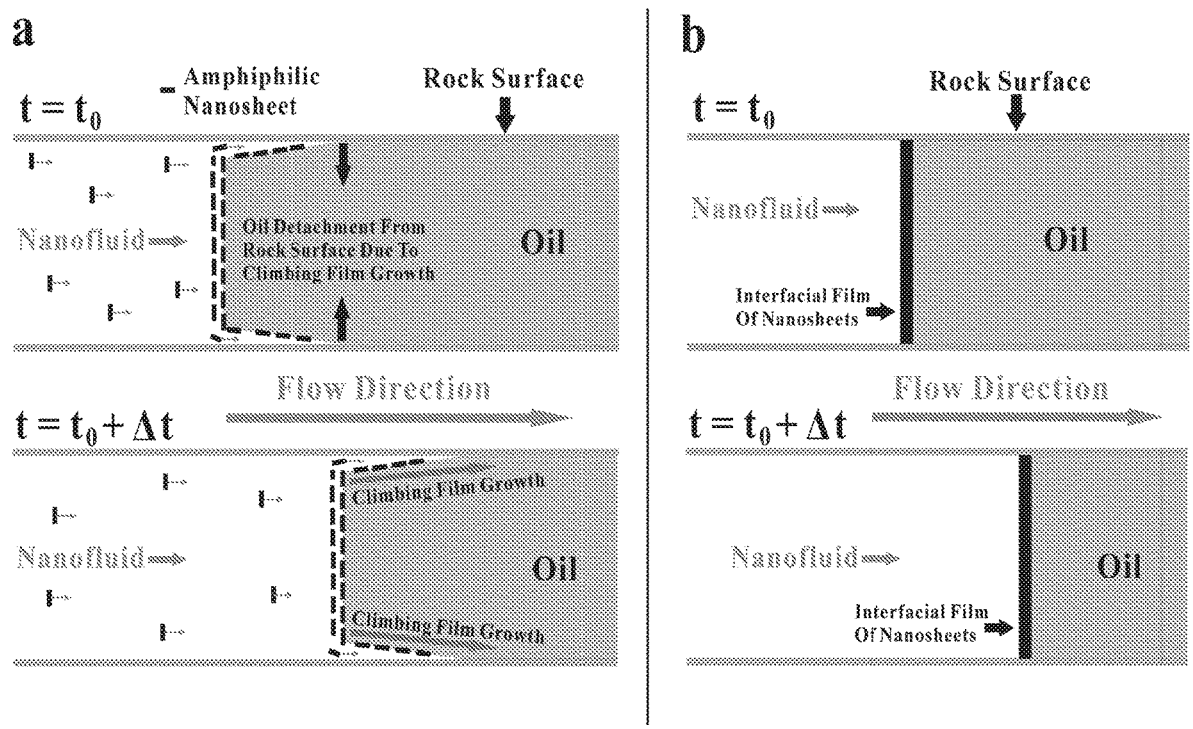
FIG. 11. Depicts a schematic illustration of oil displacement mechanisms. Panel a) shows a climbing film encapsulation mechanism for water-wet surface; and panel b) depicts a slug-like displacement mechanism, of embodiments disclosed herein.
Figure 12:
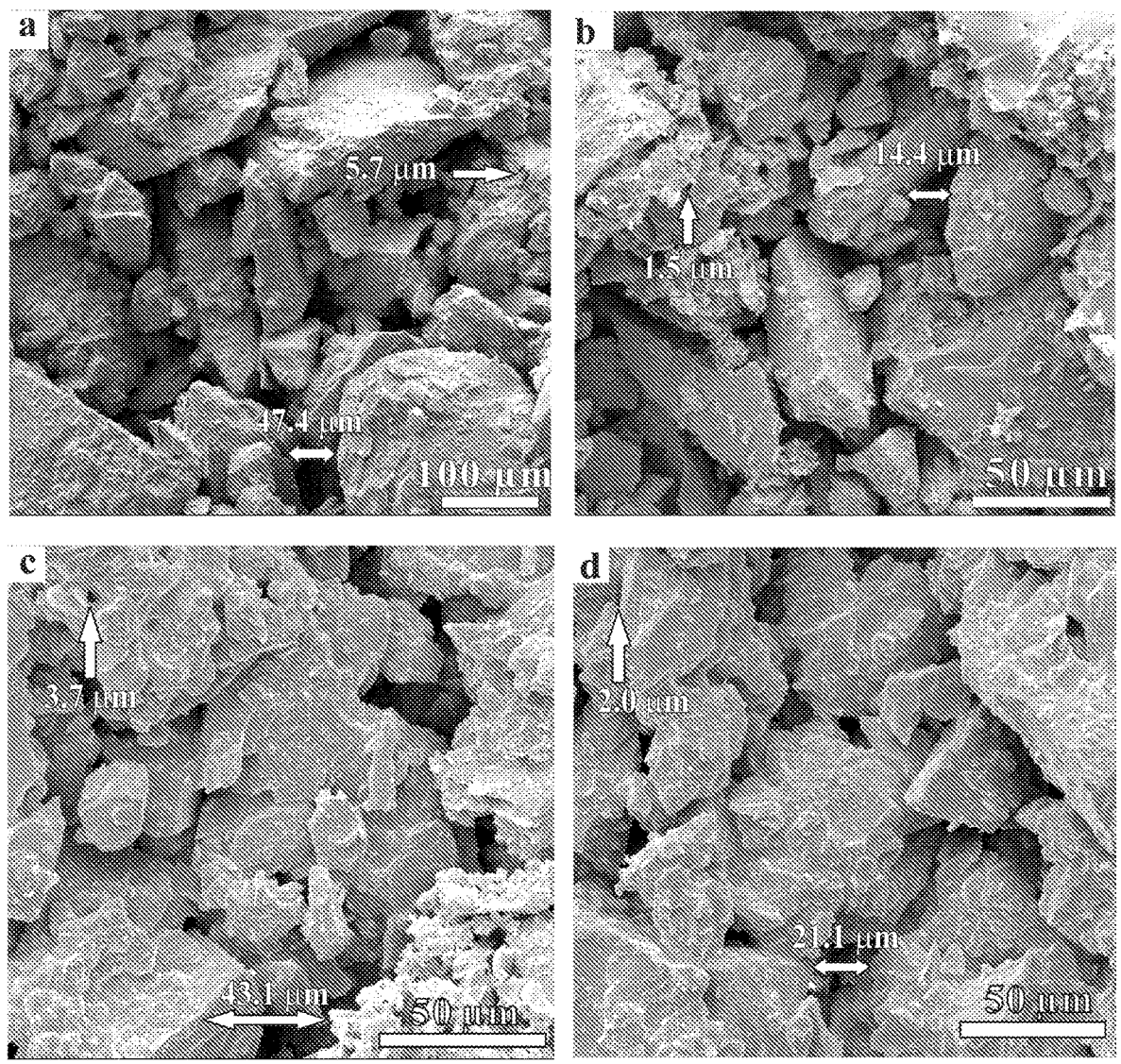
FIG. 12. Depicts SEM images of the cross sections of: panel a) rock core with high permeability and panel b) rock core with low permeability before core flooding tests; and panel c) rock core with high permeability and d) rock core with low permeability after core flooding tests disclosed herein. Arrows in each image indicate the smallest and largest pore openings.

In some embodiments, to simulate the condition of moderate hydrodynamic power, the tubes were shaken gently after injection. It was observed that for water-wet glass tubes, the climbing film grew to encapsulate the oil phase and may carry the oil forward at flow conditions, leaving very little residual oil behind. For the oil-wet plastic tube, the growth of the climbing film was not as obvious as with the glass tube, possibly due to the adsorption of nanosheets onto the wall of the tube. When subjected to vigorous shaking, the nanosheets formed flat films at interfaces for both the glass and plastic tubes. The formation of such a solid-like film was also predicted by computer simulation for near-neutral wetting spherical particles. In other embodiment, when subjected to intrusion of a glass rod, the surface of interfacial films was deformed but not ruptured (FIG. 9). After removing the glass rod, the films recovered to their original state, clearly demonstrating their elasticity. The presence of nanosheets altered not only the normal stress balance, but also the tangential stress balance, leading to a redistribution of nanosheets to form a flat shape. The elasticity of the interfacial films kept them intact even at 90° C.

In a further embodiment, and in order to demonstrate that the elasticity of the interfacial film of the amphiphilic nanosheets disclosed herein as compared to conventional surfactants, such as sodium dodecyl sulfate (SDS) and TWEEN 20 (purchased from Sigma-Aldrich) which where used as examples of ionic and non-ionic surfactants, respectively, for the comparison. With the same concentration of 0.01 wt. % (as when the interfaces formed by SDS or TWEEN 20 were subjected to the glass rod intrusion), neither exhibited observable elastic deformation but simply broke through, unlike the elastic interfacial film formed by amphiphilic nanosheets (FIG. 9, panel c).

Therefore, in terms of interfacial rheology, the interfacial films of certain exemplary embodiments disclosed herein may resist dilation and bending as characterized by the nearly flat interface after the tubes were tilted to enlarge the area of the interfaces (FIG. 8, panel a and panel b). Vigorous agitation disrupted such films for both solid surfaces (FIG. 8, panel c and panel d). However, the films reformed immediately at the interfaces and separated the oil and brine phases after shaking. This process may be driven by the amphiphilicity of nanosheets. In contrast to emulsion flooding, the interfacial film in such exemplary embodiments strictly separates the water and oil phases, which may push the oil to the outlet like a slug at flow conditions. This was confirmed in the core flooding tests, where the oil and brine came out sequentially at the outlet or outlet fluid. Such oil displacement mechanism leaves less oil residue and is free of de-emulsification, which are significant. Therefore, disclosed herein are two oil displacement mechanisms for nanofluid flooding with nanosheets: 1) the climbing film (a film of nanosheets along the tube's surface) encapsulation for water-wet surface, as shown in FIG. 7, panel a, at $t=t_0$, the increased concentration of nanosheets due to the adsorption at the oil-water interface produces the concentration gradient leading to transfer of nanosheets to the three-phase (nanofluid, oil, and rock solid) region, detaching and encapsulating oil from the rock surface. When flow continues under gentle hydrodynamic condition from $t_0$ to $t_0+\Delta t$, the film grows due to the ongoing supply of nanosheets from the nanofluid and carries the oil phase forward; and 2) slug-like displacement by the interfacial film, as seen in FIG. 7, panel b, at $t=t_0$, an elastic interfacial film forms at the oil-water interface at strong hydrodynamic power condition. The film can resist bending and also reform after being disrupted. As a result, at $t=t_0+\Delta t$, oil is slug-like and displaced over a certain distance.

The amphiphilic Janus nanosheets disclosed herein may have a lower chance to be captured by the rock surface or to plug the rock pores due to the self-accumulating at the oil-water interface, which may also contribute to the high efficiency of oil recovery. The cross sections of rock cores were examined by SEM before and after core flooding and are displayed in FIG. 8. In each figure, the smallest and largest pore openings are both labeled. As for the rock cores with high permeability (FIG. 8, panel a and panel c), after nanofluid flooding, the pore sizes at the two ends remained at the same level, comparable to those before flooding. Similar results were also detected in rock cores with low permeability (FIG. 8, panel b and panel d), with survival of narrow pore openings of around 2 microns. The observation that there were no noticeable changes in the pore opening sizes indicated that the nanofluid disclosed herein caused minimal damage to the permeability of the rock pores. In addition, fresh water was used to prepare the nanofluid for the tests described above. However, brine is preferred in some operations (e.g., seawater in offshore reservoirs or when fresh water is scarce) to reduce cost and conserve fresh water resources. This requires that nanosheets be stable in a saline environment for a certain time before reaching underground reservoirs. It is disclosed herein that sequential addition of polyvinylpyrrolidone (PVP) and polyvinyl alcohol (PVA) provided good stability to embodiments of the nanofluid in brine.

Therefore, in some embodiments the Janus graphene nanosheet (JGN) surfactants described herein may be used in the Oil and Gas Industry for enhancing oil recovery, corrosion inhibition and also for environmental cleanup. Wherein such surfactants may be further customized by virtue of their behavior in phase tests at different conditions including salt concentrations; temperature, different PH environment and their corresponding interfacial tension, and further compatibility testing with polymer, emulsion viscosity and rheology tests, and core flooding tests at different conditions.

In some embodiments, the Janus graphene nanosheet (JGN) surfactants disclosed herein may comprise any one of, or any combination of: a larger specific surface area; larger aspect ratio, more efficient adsorption; lower density (wherein such a low density results in a light weight emulsion, and wherein the light weight emulsion has greater well/reservoir mobility), and smaller particle size as compared to surfactants of the prior art. In some further embodiments the JGN surfactants described herein also comprise a higher mechanical strength which may impart emulsions formed by such surfactants with a longer functional life span, and protect the emulsion droplets from negative well environmental factors and destruction of the emulsion in EOR operations, in comparison to emulsions of the prior art. Further, disclosed herein are tertiary or enhanced oil recovery experiments using nanofluid flooding with embodiments of the graphene-based Janus amphiphilic nanosheets at a low concentration. The result from core flooding measurements showed that the oil enhancement efficiency of 15.2% by such nanofluid flooding is more than three times that of the previously reported best efficiency (4.7%) under similar conditions at 0.01 wt. % concentration. The behavior tests of nanosheets in oil and brine system provided evidence that under a saline environment, 1) the accumulation of nanosheets at the oil-water interface, 2) the appearance of climbing films, and 3) the generation of elastic interfacial films may be responsible for the high oil recovery efficiency.

The above disclosure is directed to various exemplary embodiments of the invention. These embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

What is claimed is:

1. A tertiary oil recovery surfactant, wherein said surfactant comprises:
   a nanofluid, wherein said nanofluid comprises ethanol and water; and
   0.005 wt % of an asymmetrical Janus graphene nanosheet (JGN), wherein the JGN comprises: a single layer two dimensional graphene oxide sheet, wherein said graphene oxide sheet is about 1 nm thick and said graphene oxide sheet comprises:
   first face, and a second face, wherein said first face and said second face each comprise at least one oxygen-rich functional group;
   a hydrophobic species linked to said first face by said oxygen rich functional group; and a hydrophilic species linked to the second face, wherein the hydrophilic species is at least one of hydroxyl, epoxy, and carboxyl and wherein said surfactant has a density of about 0.2 to 1.5 g cm$^{-3}$, and wherein said tertiary oil recovery surfactant comprises a total oil recovery factor of about 78%.

2. The surfactant of claim 1, wherein said nanosheet further comprises a specific surface area of about 500 to about 5000 m2/g.

3. The surfactant of claim 1, wherein said nanosheet comprises an aspect ratio of about 10 to 1000.

4. The surfactant of claim 1, wherein said nanosheet adsorbs a greater surface area of oil droplets as compared to the same mass of spherical nanoparticle surfactants.

5. The surfactant of claim 1, wherein said nanosheet comprises a tensile strength of about 10-60 GPa.

6. An emulsion comprising: the surfactant of claim 1; water; and an oil.

* * * * *